(No Model.)
O. GASSETT.
STEAM TRAP.
No. 526,862. Patented Oct. 2, 1894.
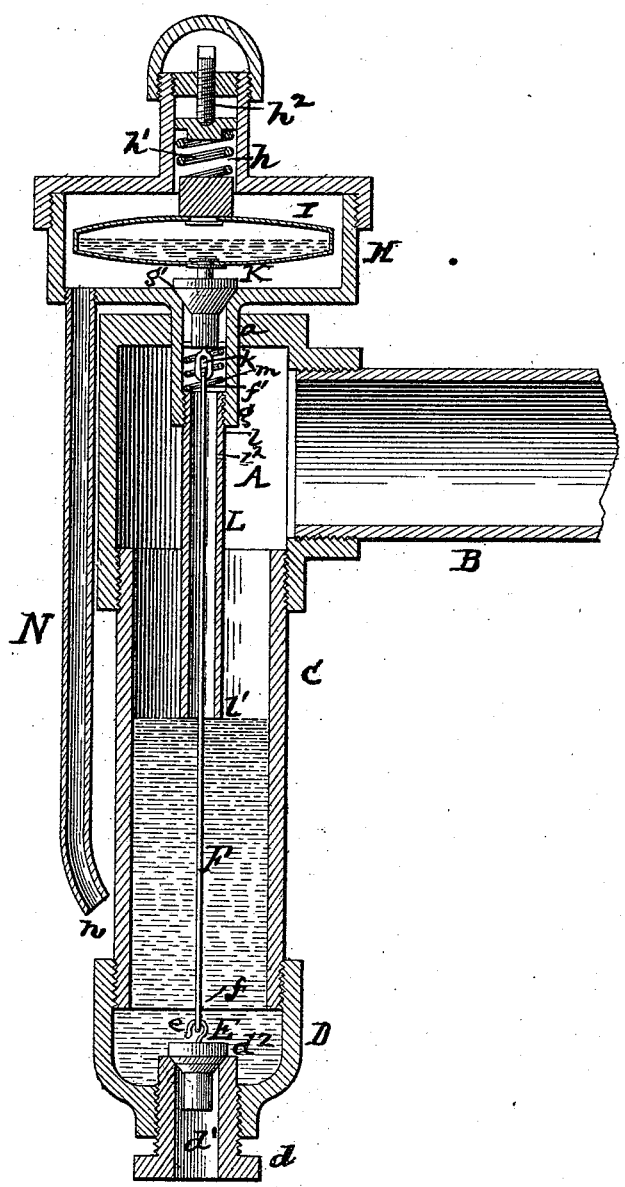
Witnesses:
C. F. Fadely
C. H. Mayers
Inventor:
Oscar Gassett,
By W. H. Singleton,
Atty.

UNITED STATES PATENT OFFICE.

OSCAR GASSETT, OF BOSTON, MASSACHUSETTS, ASSIGNOR TO THE CROSBY STEAM GAGE AND VALVE COMPANY, OF SAME PLACE.

STEAM-TRAP.

SPECIFICATION forming part of Letters Patent No. 526,862, dated October 2, 1894.

Application filed November 18, 1893. Serial No. 491,373. (No model.)

*To all whom it may concern:*

Be it known that I, OSCAR GASSETT, a citizen of the United States, residing at Boston, in the county of Suffolk and State of Massachusetts, have invented certain new and useful Improvements in Steam-Traps; and I do hereby declare the following to be a full, clear, and exact description of the invention, such as will enable others skilled in the art to which it appertains to make and use the same.

This invention relates to improvements in steam traps such as are used in radiators employed in heating railway cars.

The object of the invention is to provide a way for condensed water to escape in case the valve at the bottom of the trap has become closed up with ice, and in the plan I have provided two valves, one at the top and one at the bottom, so connected that both will be open when the trap is cold, and both will be closed when the trap is hot. As it is well known to those who have charge of steam heating on railroads that steam traps are of little use when they are placed so as to catch the drip of water from the radiators as in cars; and, as it is necessary to have a valve that will control the drip, I provide another valve in connection, so that, during the time the trap is in use, the upper valve operates and lets out the water above a certain amount, and, when steam is shut off, both will open and remain so until steam comes on again, as hereinafter described.

The drawing is a longitudinal section, showing the valves closed, as would be the case when the steam had expelled the water down to the bottom of the inner pipe.

In the drawing: the letter A indicates the shell of the trap into which leads the pipes, B and C, the former, B, connected with the radiator. To the bottom of the pipe, C, is connected the cap, D, into which is screwed at the bottom the adjustable bushing, $d$, in which is the central orifice, $d'$, forming the valve seat, $d^2$. In this orifice, $d$, and at the valve seat, $d^2$, is the valve, E, to which is secured, by a hook, $e$, and eye, $f$, a rod, F, which extends upwardly into the trap.

In the top of the shell, A, aligned with the orifice, $d'$, is a hole, $a$. Down through this hole, $a$, there extends into the shell, A, a hollow stem, $g$, of a box, H. Within this box, H, is placed a chamber, I, which is made of flexible material and is partially filled with some expansible fluid, such as petroleum. In the top of the box, H, there is a recess, $h$, in which is a spring, $h'$, which bears against the top of the chamber, I, and the tension of the spring may be regulated by the screw, $h^2$.

Extending downwardly from the center of the under side of the chamber, I, is a valve, K, which fits into the bore of the stem, $g$, the opening, $g'$, of said bore forming the valve seat. Screwed into the lower end of the stem, $g$, is the upper end, $l$, of a pipe, L, which extends downwardly into the trap and has its lower end, $l'$, some distance above the bottom of the trap. This pipe, L, may have a hole, $l^2$, therein near the stem, $g$. Within the stem, $g$, is placed a spiral spring, $m$, which bears between the valve, $k$, and the upper end, $l$, of the pipe, L. The rod, F, passes upward through the pipe, L, and has its upper end, $f'$, caught into an elongated eye, $k$, attached to the bottom of the valve, K. Leading from the box, H, on the outside of the trap is a pipe, N, which extends downwardly and has its lower end, $n$, curved inwardly and terminating close to the trap near the bottom of the pipe, C.

The operation of the trap is as follows: When steam is let into the radiator, it finds its way to the trap, and if the lower valve, E, be closed with ice, the top valve, K, being open, allows the steam to escape from the trap up through pipe, L, and into the box, H, containing chamber, I, and out through pipe, N, and against the lower end of the trap, thus assisting the steam and hot water passing through the trap to thaw out the latter until the ice is melted from under valve, E, permitting it to drop and close. The elongated eye, $k$, of valve, K, permits a play up and down of the rod, L, so that, when valve, E, is iced all over while it is up from its seat and open, the rod, L, will not be pushed down when valve, K, is pushed down by the expansible chamber, I, but the elongated eye, $k$, will move down with valve, K, and the rod, L, will stay up until the ice at the lower valve is melted; then valve, E, will drop. While the steam and hot water are passing through box, H, they are heating expansible chamber, I, and by the time clear steam enters box, H, the said chamber is expanded by the heated fluid it contains, and will cause the valve, K, to be pushed down and shut off the discharge of steam, but, when water accumulates in the trap enough to cover the bottom of pipe, L, it will be carried up through said pipe into box, H, as before, until steam comes again. In case the trap should become iced at the lower end enough to cover the end of the pipe, L, the air within the trap will get out through the small hole, $l^2$, in pipe, L, at the top. Then, when steam arrives, it will thaw quickly around pipe, L, and as the resistance is less for the water to push up through the said pipe, than it is for steam to pass through the said small hole, it will consequently rid the trap of ice by the passage of hot water. It will be seen that, when steam is shut off, the water will run out of pipe, N, and that which is in pipe, L, will fall back into the trap and run out by the lower valve, when the trap is cold enough to open both valves; but, in order to depend on the upper valve controlling the water during the time the trap is in use and to keep the lower valve closed, the adjusting bushing, $d$, is set up high enough to allow the valve, E, to seat and close a little before the top valve, K, does, but not enough to allow the top valve, K, to be lifted wide open without lifting the lower valve open, thus letting out the water that has accumulated up to the bottom of the pipe, L.

Having thus described my invention, what I claim is—

1. A steam trap, provided with two valves connected vertically together, and in the same line in combination with a device connected to one valve and for operating the same, as set forth.

2. A steam trap, provided with two valves connected together, and in the same line the connection between the two valves being loose and an expansion device, as set forth.

3. A steam trap, provided with two valves connected together, one valve having an elongated eye in which is held a rod extending from the other valve in combination with an expansion device, as set forth.

4. The combination of the valve, K, having the elongated eye, $k$, and the valve, E, with the rod, F, secured at one end to the valve, E, and at the other end to the elongated eye, $k$, and an expansion device as set forth.

5. In a steam trap, an inner discharge pipe, and an outer discharge pipe, the latter having its discharge end turned toward the trap, as and for the purpose set forth.

In testimony whereof I affix my signature in presence of two witnesses.

OSCAR GASSETT.

Witnesses:
JOSHUA H. MILLETT,
RALPH W. FOSTER.